United States Patent
Kim et al.

(10) Patent No.: US 11,153,775 B2
(45) Date of Patent: Oct. 19, 2021

(54) METHOD AND APPARATUS FOR PERFORMING NETWORK COOPERATIVE COMMUNICATION TO DISTRIBUTE TRAFFIC IN A WIRELESS COMMUNICATION SYSTEM

(71) Applicant: LG ELECTRONICS INC., Seoul (KR)

(72) Inventors: Hyungtae Kim, Seoul (KR); Kijun Kim, Seoul (KR); Hanbyul Seo, Seoul (KR); Bonghoe Kim, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 124 days.

(21) Appl. No.: 15/548,254

(22) PCT Filed: Jan. 14, 2016

(86) PCT No.: PCT/KR2016/000397
§ 371 (c)(1),
(2) Date: Aug. 2, 2017

(87) PCT Pub. No.: WO2016/143996
PCT Pub. Date: Sep. 15, 2016

(65) Prior Publication Data
US 2018/0027441 A1    Jan. 25, 2018

Related U.S. Application Data

(60) Provisional application No. 62/130,565, filed on Mar. 9, 2015, provisional application No. 62/136,623, filed
(Continued)

(51) Int. Cl.
H04B 7/0452    (2017.01)
H04W 28/02    (2009.01)
(Continued)

(52) U.S. Cl.
CPC ...... *H04W 28/0221* (2013.01); *H04B 7/0452* (2013.01); *H04J 11/004* (2013.01);
(Continued)

(58) Field of Classification Search
CPC .......... Y02D 70/1242; Y02D 70/1262; Y02D 70/00; Y02D 70/444; Y02D 70/1264;
(Continued)

(56) References Cited

U.S. PATENT DOCUMENTS

2013/0176891 A1    7/2013  Lee et al.
2014/0050279 A1*   2/2014  Kishiyama ............. H04J 11/004
                                                    375/285

(Continued)

FOREIGN PATENT DOCUMENTS

EP    1936827 A2    6/2008

OTHER PUBLICATIONS

3GPP TS 36.213 V10.12.0, 3rd Generation Partnership Project; Technical Specification Group Radio Access Network;Evolved Universal Terrestrial Radio Access (E-UTRA); Physical layer procedures, Mar. 2014, pp. 1-127 (Year: 2014).*

*Primary Examiner* — Un C Cho
*Assistant Examiner* — Lalita W Pace
(74) *Attorney, Agent, or Firm* — Birch, Stewart, Kolasch & Birch, LLP

(57) ABSTRACT

A method for receiving a downlink signal from a base station (BS) by a user equipment (UE) in a wireless communication system is disclosed. The method includes receiving power multiplexing information from the BS, receiving a reference signal and the downlink signal from the BS, calculating reception power of an interference signal from reception power of the downlink signal, using the reference signal and the power multiplexing information, and acquiring a data signal of the UE by eliminating the reception power of the
(Continued)

interference signal from the reception power of the downlink signal.

6 Claims, 6 Drawing Sheets

Related U.S. Application Data on Mar. 22, 2015, provisional application No. 62/157,974, filed on May 7, 2015, provisional application No. 62/220,250, filed on Sep. 18, 2015.

(51) Int. Cl.
| | |
|---|---|
| *H04J 11/00* | (2006.01) |
| *H04L 27/34* | (2006.01) |
| *H04W 52/02* | (2009.01) |
| *H04W 52/24* | (2009.01) |
| *H04B 7/06* | (2006.01) |
| *H04L 5/00* | (2006.01) |

(52) U.S. Cl.
CPC ..... *H04L 27/3488* (2013.01); *H04W 52/0212* (2013.01); *H04W 52/0238* (2013.01); *H04W 52/243* (2013.01); *H04B 7/0617* (2013.01); *H04L 5/0007* (2013.01); *H04L 5/0016* (2013.01); *Y02D 30/70* (2020.08)

(58) Field of Classification Search
CPC ......... H04W 28/0221; H04W 52/0212; H04W 52/243; H04W 52/0238; H04J 11/004; H04L 27/3488; H04L 5/0016; H04L 5/0007; H04B 7/0452; H04B 7/0617
See application file for complete search history.

(56) References Cited

U.S. PATENT DOCUMENTS

| | | | |
|---|---|---|---|
| 2014/0112177 A1 | 4/2014 | Park et al. | |
| 2014/0146765 A1 | 5/2014 | Ji et al. | |
| 2014/0211655 A1 | 7/2014 | Yoo et al. | |
| 2014/0220990 A1 | 8/2014 | Lorca Hernando | |
| 2014/0242977 A1 | 8/2014 | Kim et al. | |
| 2014/0256344 A1 | 9/2014 | Yu et al. | |
| 2015/0124691 A1* | 5/2015 | Li | H04B 7/0854 370/312 |
| 2015/0147994 A1* | 5/2015 | Tsai | H04B 1/1027 455/296 |
| 2015/0312074 A1* | 10/2015 | Zhu | H04L 27/2627 370/329 |
| 2016/0100413 A1* | 4/2016 | Hwang | H04B 7/0452 370/330 |
| 2017/0078973 A1* | 3/2017 | Ohwatari | H04L 27/2626 |
| 2017/0141868 A1* | 5/2017 | Morita | H04W 16/28 |
| 2017/0230135 A1* | 8/2017 | Oh | H04L 5/0048 |
| 2017/0331573 A1* | 11/2017 | Li | H04J 1/04 |
| 2018/0077687 A1* | 3/2018 | Yoshimura | H04L 27/36 |

* cited by examiner

[Fig. 1]
E-UMTS
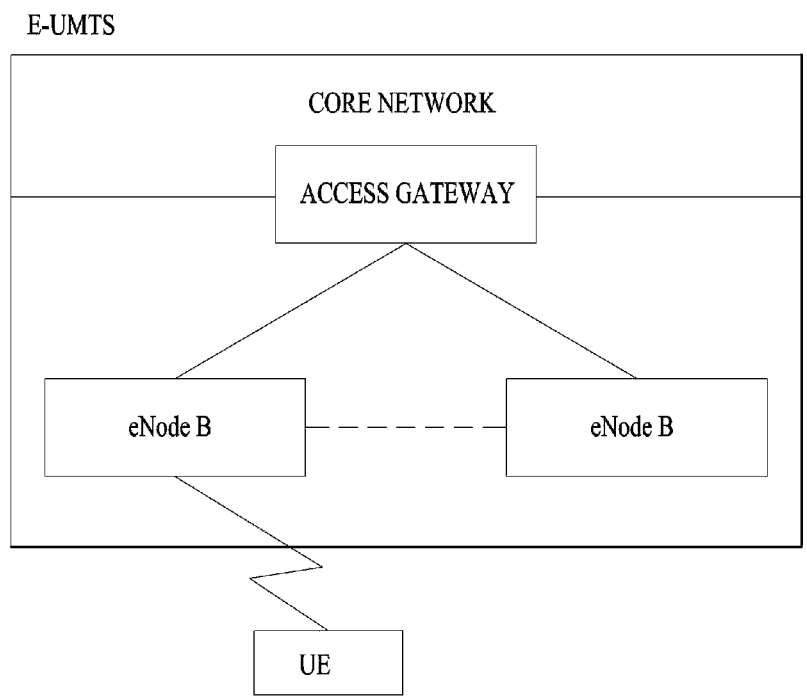

[Fig. 2]
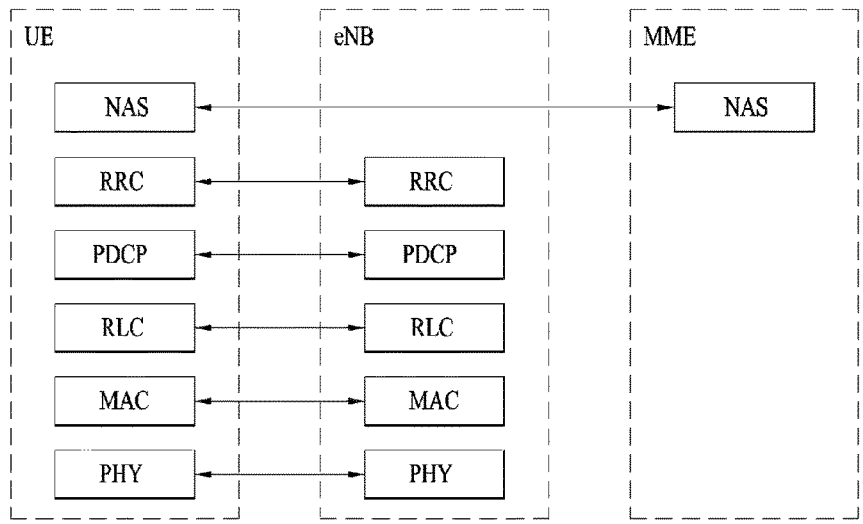
(A) CONTROL-PLANE PROTOCOL STACK
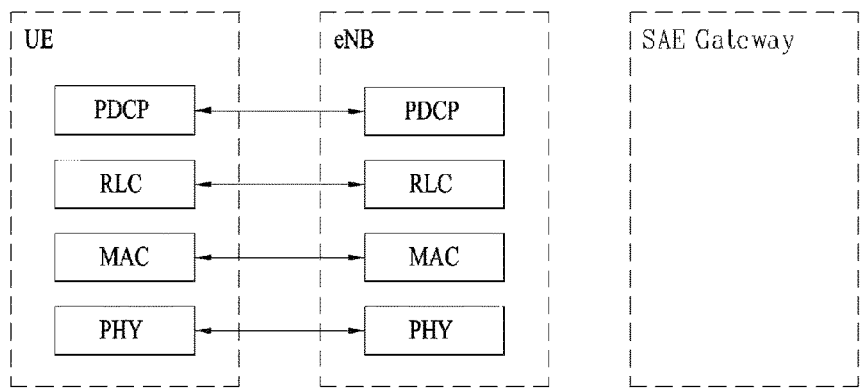
(B) USER-PLANE PROTOCOL STACK
[Fig. 3]
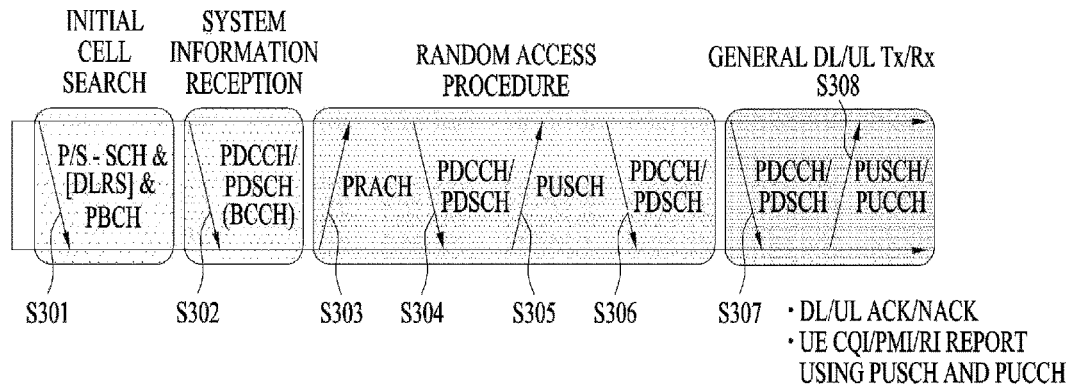

[Fig. 4]
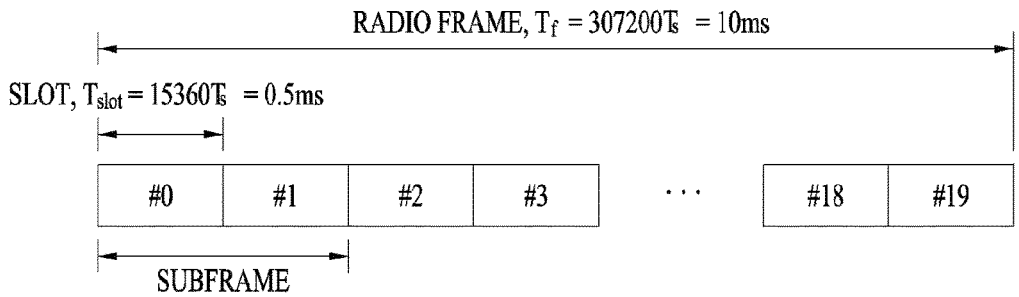
[Fig. 5]
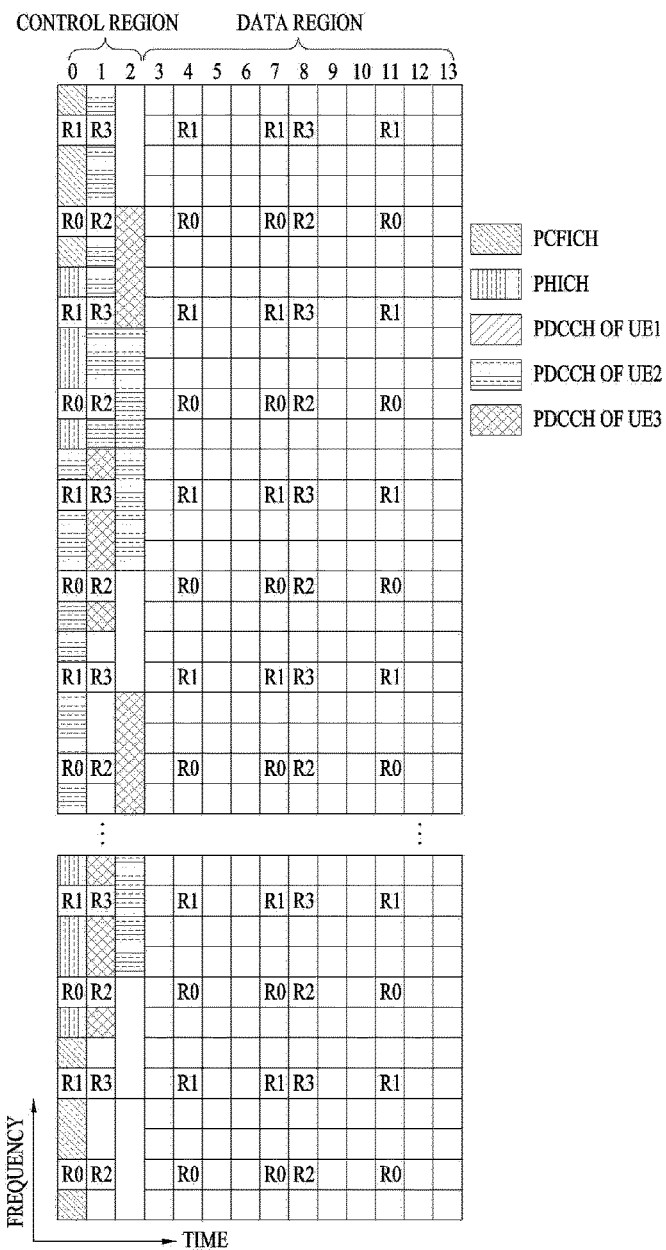

[Fig. 6]
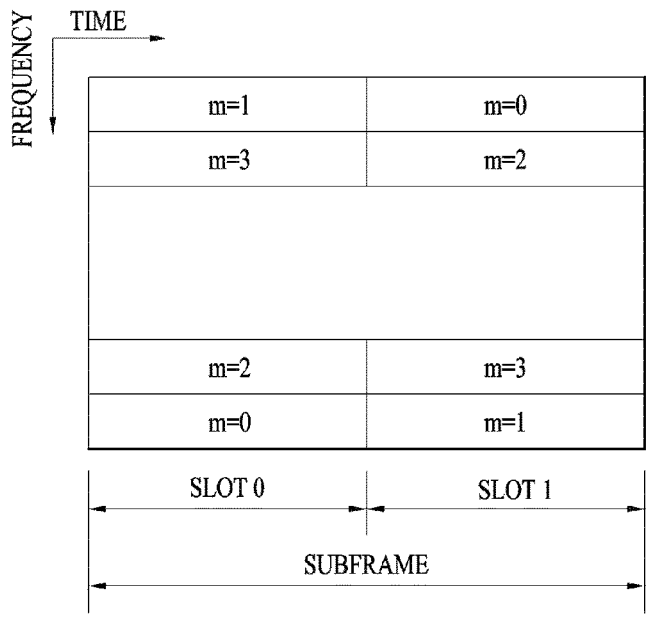
[Fig. 7]
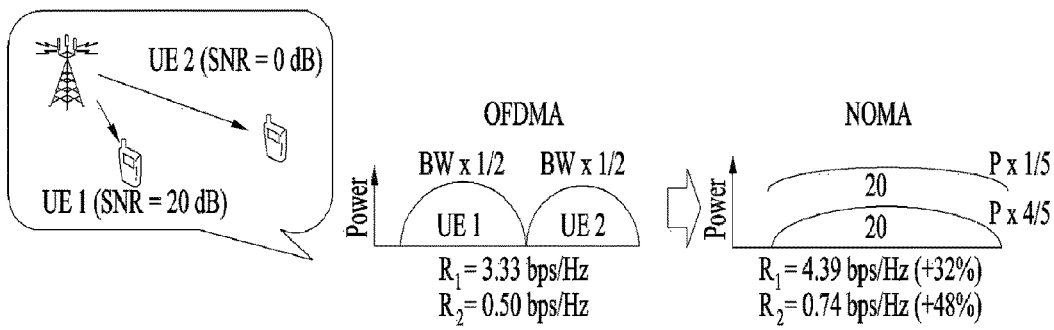
[Fig. 8]
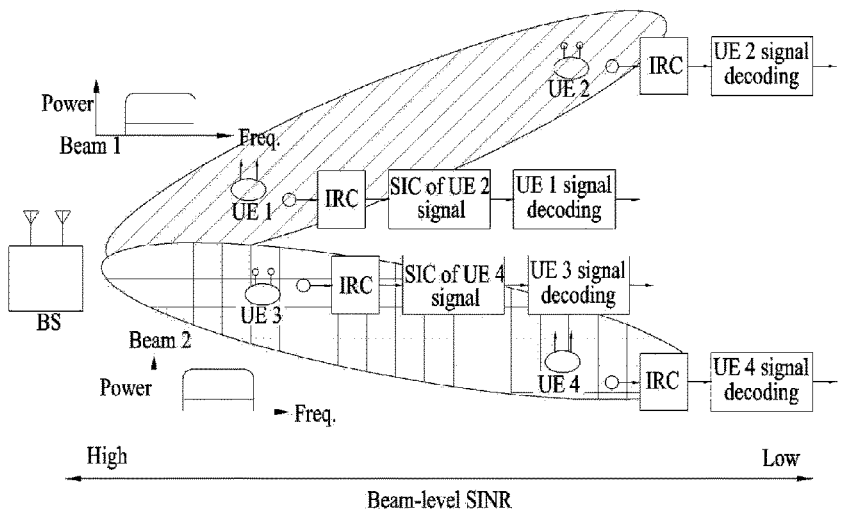

[Fig. 9]
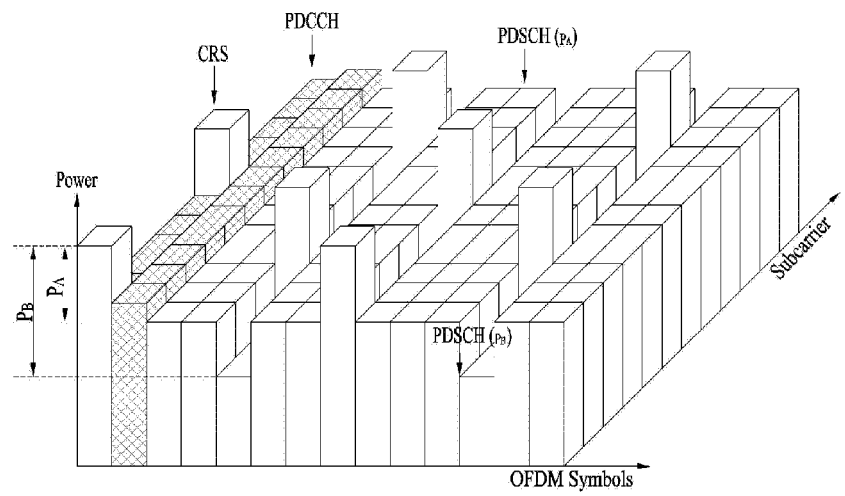
[Fig. 10]
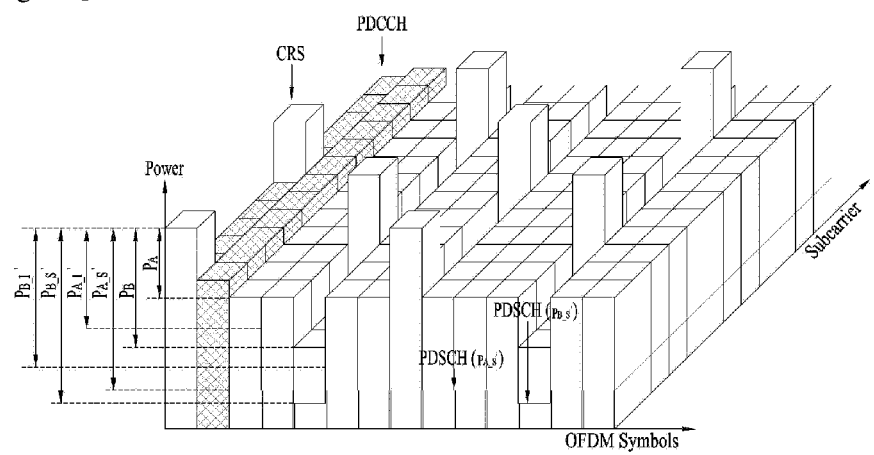

[Fig. 11]
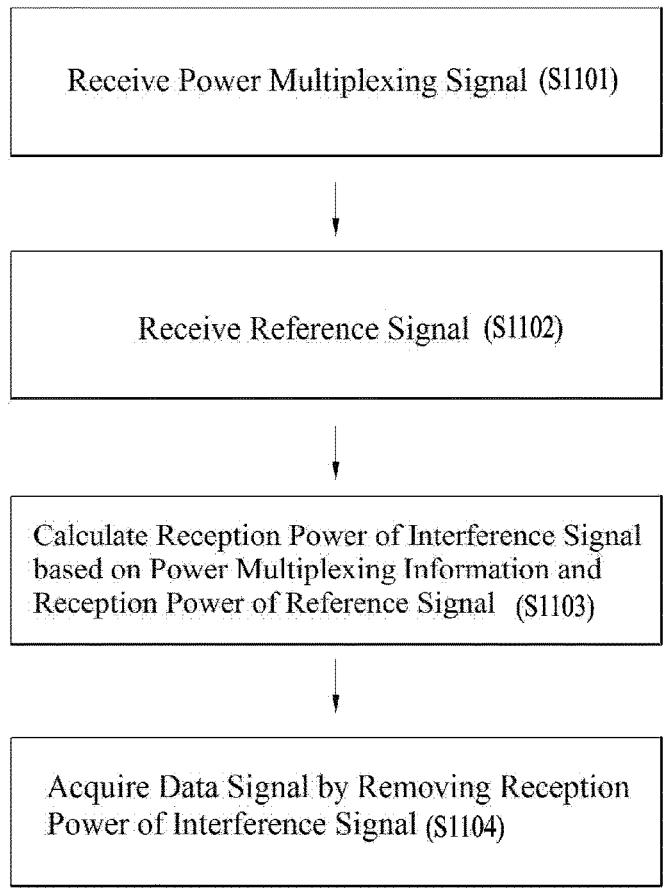
[Fig. 12]
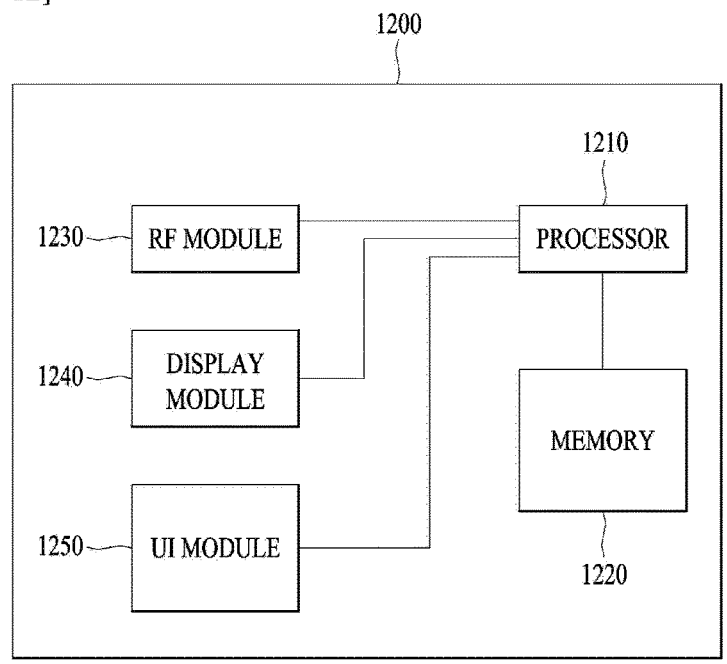

METHOD AND APPARATUS FOR PERFORMING NETWORK COOPERATIVE COMMUNICATION TO DISTRIBUTE TRAFFIC IN A WIRELESS COMMUNICATION SYSTEM

CROSS REFERENCE TO RELATED APPLICATIONS

This application is the National Phase of PCT International Application No. PCT/KR2016/000397, filed on Jan. 14, 2016, which claims priority under 35 U.S.C. 119(e) to U.S. Provisional Application No. 62/130,565, filed on Mar. 9, 2015, No. 62/136,623, filed on Mar. 22, 2015, No. 62/157,974, filed on May 7, 2015, and No. 62/220,250, filed on Sep. 18, 2015, all of which are hereby expressly incorporated by reference into the present application.

TECHNICAL FIELD

The present invention relates to a wireless communication system, and more particularly, to a method and apparatus for performing network cooperative communication to distribute traffic in a wireless communication system.

BACKGROUND ART

As an example of a mobile communication system to which the present invention is applicable, a 3rd generation partnership project long term evolution (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in 3GPP. E-UMTS may be generally referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, the E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20 MHz to provide a downlink or uplink transmission service to multiple UEs. Different cells may be configured to provide different bandwidths. The eNB controls data transmission and reception to and from a plurality of UEs. Regarding downlink (DL) data, the eNB transmits DL scheduling information to notify a corresponding UE of a time/frequency domain within which data is to be transmitted, coding, data size, and hybrid automatic repeat and request (HARQ)-related information by transmitting DL scheduling information to the UE. In addition, regarding uplink (UL) data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of a UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, a simplified structure, an open interface, appropriate power consumption of a UE, etc. are required.

DISCLOSURE OF INVENTION

Technical Problem

An object of the present invention devised to solve the problem lies on a method and apparatus for performing network cooperative communication to distribute traffic in a wireless communication system.

It will be appreciated by persons skilled in the art that the objects that could be achieved with the present invention are not limited to what has been particularly described hereinabove and the above and other objects that the present invention could achieve will be more clearly understood from the following detailed description.

Solution to Problem

The object of the present invention can be achieved by providing a method for receiving a downlink signal from a base station (BS) by a user equipment (UE) in a wireless communication system. The method includes receiving power multiplexing information from the BS, receiving a reference signal and the downlink signal from the BS, calculating reception power of an interference signal from reception power of the downlink signal, using the reference signal and the power multiplexing information, and acquiring a data signal of the UE by eliminating the reception power of the interference signal from the reception power of the downlink signal.

In another aspect of the present invention, a UE in a wireless communication system includes a wireless communication module configured to receive a signal from a BS, and a processor configured to process the signal. The processor controls the wireless communication module to receive power multiplexing information from the BS and receive a reference signal and the downlink signal from the BS. Also, the processor calculates reception power of an interference signal from reception power of the downlink signal, using the reference signal and the power multiplexing information, and acquires a data signal of the UE by eliminating the reception power of the interference signal from the reception power of the downlink signal.

According to the above aspects, the reception power of the downlink signal may be calculated from reception power of the reference signal. The interference signal may be a data signal of another UE, and the same precoding may be applied to the data signal of the UE and the data signal of the other UE, and the data signal of the UE and the data signal of the other UE may be transmitted in the same time resources and the same frequency resources.

The power multiplexing information may include information about a ratio between the reception power of the downlink signal and reception power of the data signal. Or the power multiplexing information may include information about a ratio of reception power of the data signal to the reception power of the interference signal. Or the power multiplexing information may include information about a ratio of reception power of the data signal to the reception power of the reference signal, and information about a ratio of the reception power of the interference signal to the reception power of the reference signal.

Or the reference signal may be received with the same power as for the data signal of the UE through a first antenna port, and the reference signal may be received with the same power as for the interference signal through a second antenna port. In this case, the power multiplexing information may include information about the first antenna port and the second antenna port.

Advantageous Effects of Invention

According to an embodiment of the present invention, a UE can transmit and receive signals more efficiently through network cooperation for traffic distribution.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 1 is a diagram schematically illustrating a network structure of an evolved universal mobile telecommunications system (E-UMTS) as an exemplary radio communication system;

FIG. 2 is a diagram illustrating structures of a control plane and a user plane of a radio interface protocol between a UE and an evolved UMTS terrestrial radio access network (E-UTRAN) based on the 3GPP radio access network specification;

FIG. 3 is a diagram illustrating physical channels used in a 3GPP system and a general signal transmission method using the same;

FIG. 4 is a diagram illustrating the structure of a radio frame used in a long term evolution (LTE) system;

FIG. 5 is a diagram illustrating the structure of a DL radio frame used in an LTE system;

FIG. 6 is a diagram illustrating the structure of a UL subframe in an LTE system;

FIGS. 7 and 8 are conceptual views illustrating an interference cancellation scheme in a multi-user superposition transmission (MUST) system;

FIG. 9 is an exemplary view illustrating the concept of power allocation in an LTE system;

FIG. 10 is an exemplary view illustrating the concept of power allocation in a MUST system according to an embodiment of the present invention;

FIG. 11 is a flowchart illustrating an exemplary method for receiving a signal from an evolved Node B (eNB) at a MUST user equipment (UE); and FIG. 12 is a block diagram of a communication apparatus according to an embodiment of the present invention.

BEST MODE FOR CARRYING OUT THE INVENTION

Hereinafter, structures, operations, and other features of the present invention will be readily understood from the embodiments of the present invention, examples of which are illustrated in the accompanying drawings. Embodiments which will be described hereinbelow are examples in which technical features of the present invention are applied to a 3GPP system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In addition, although the embodiments of the present invention will be described based on frequency division duplexing (FDD), the FDD mode is purely exemplary and the embodiments of the present invention can easily be applied to half-FDD (H-FDD) or time division duplexing (TDD) with some modifications.

In the present disclosure, a base station (eNB) may be used as a broad meaning including a remote radio head (RRH), an eNB, a transmission point (TP), a reception point (RP), a relay, etc.

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, reconfiguration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

FIG. 4 is a diagram illustrating the structure of a radio frame used in an LTE system.

Referring to FIG. 4, the radio frame has a length of 10 ms ($327200 \times T_s$) and includes 10 equal-sized subframes. Each of the subframes has a length of 1 ms and includes two slots. Each slot has a length of 0.5 ms ($15360*T_s$). In this case, Ts denotes a sampling time represented by $T_s=1/(15 \text{ kHz} \times 2048)=3.2552 \times 10^8$ (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

FIG. 5 is a diagram illustrating control channels contained in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIG. 5, R1 to R4 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

FIG. 6 is a diagram illustrating the structure of a UL subframe in an LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 6.

The present invention provides a method for performing signaling and specific operations required for an interference cancellation receiver in a multi-user superposition transmission (MUST) system. MUST refers to a multiple access scheme that may achieve high bandwidth efficiency by allocating a plurality of UEs to the same frequency-time resources using a preset power ratio and mitigating preset inter-user interference, basically based on the premise that a signal is transmitted to the interference cancellation receiver, in addition to time-frequency domain resource allocation of a legacy OFDMA system. MUST is under discussion as a significant candidate technology for a future 5th generation (5G) system.

Resource allocation of an eNB and interference cancellation of a UE are important techniques in the MUST system. Particularly, receivers may be classified into symbol level interference cancellation (SIC) receivers represented by a maximum likelihood (ML) receiver, and codeword level interference cancellation (CWIC) receivers represented by a minimum mea-square error (MMSE)-based linear CWIC (L-CWC) receiver and an ML-CWC receiver, depending on their interference cancellation schemes. A reception gain is different in a given environment according to each interference cancellation scheme. In general, an ML receiver and a CWIC receiver achieve high gains in proportion to the implementation complexity of a UE.

FIGS. 7 and 8 are conceptual views of an interference cancellation scheme in a MUST system.

FIG. 7 conceptually illustrates the difference between the legacy OFDMA system and the MUST system. Particularly, it is assumed in FIG. 7 that the signal to noise ratio (SNR) of a first UE (UE1) is 20 dB and the SNR of a second UE (UE2) is 0 dB.

Specifically, in the legacy OFDMA system, UE1 and UE2 receive DL signals with the same power, using equal halves of a bandwidth, that is, in different frequency bands. In this case, a data rate per frequency of UE1 is 3.33 bps/Hz and a data rate per frequency of UE2 is 0.5 bps/Hz. In the MUST system, each of UE1 and UE2 uses a total band. ⅘ of total transmission power is allocated to UE2, whereas ⅕ of the total transmission power is allocated to UE1. In this case, the data rate per frequency of UE1 is increased to 4.39 bps/Hz and the data rate per frequency of UE2 is increased to 0.74 bps/Hz.

FIG. 8 is a schematic view illustrating a signal reception operation in the MUST system. Specifically, an eNB transmits signals to which the same beamforming has been applied to UE1 and UE2 in the same time/frequency resources. In this case, although UE2 also receives a signal intended for UE1, the impact of the signal of UE1 is negligibly small because of a reception power difference. Thus, UE2 may decode a signal intended for UE2 simply by an interference rejection combining (IRC) algorithm. On the other hand, only after removing the transmission signal intended for UE2, that is, performing an SIC operation on the signal of UE2 in addition to the IRC algorithm, UE1 may decode the signal intended for UE1.

Likewise, the eNB transmits signals to which the same beamforming has been applied to a third UE (UE3) and a fourth UE (UE4) in the same time/frequency resources. In this case, although UE4 also receives a signal intended for UE3, the impact of the signal is negligibly small because of a reception power difference. Thus, UE4 may decode a signal intended for UE4 simply by the IRC algorithm. On the other hand, only after removing the transmission signal intended for UE4, that is, performing an SIC operation on the signal of UE4 in addition to the IRC algorithm, UE3 may decode the signal intended for UE3.

Before describing the present invention, DL power control in a 3GPP LTE system will be described.

For power allocation to DL resources, the 3GPP LTE system defines energy per resource element (EPRE). Herein, cell-specific reference signal (CRS) EPRE is a reference. The CRS EPRE is determined by higher-layer signaling and has a fixed value in a DL system bandwidth and subframe.

The EPRE of PDSCH resources carrying actual data may be represented as a certain ratio to CRS EPRE in the LTE system. For example, a ratio of CRS EPRE to PDSCH EPRE in an OFDM symbol without CRSs is defined as $\rho_A$, and a ratio of CRS EPRE to PDSCH EPRE in an OFDM symbol with CRSs is defined as $\rho_B$.

FIG. 9 is an exemplary view illustrating the concept of power allocation in an LTE system. Particularly, FIG. 9 illustrates a coordinate system in which the horizontal axis represents OFDM symbols, the vertical axis represents subcarriers, and the heights of OFDM symbols represent power.

In FIG. 9, $\rho_A$ is determined according to a power offset $\delta_{power-offset}$ determined based on whether multi-user MIMO (MU-MIMO) is applied or not, and a UE-specific parameter $P_A$, and $\rho_B/\rho_A$ is determined according to the number of antenna ports and a cell-specific parameter $P_B$.

The current LTE system defines $\rho_A$ differently largely in two cases. In the case of PDSCH data transmission to which 4-port CRS-based transmit diversity is applied, $\rho_A$ is determined by the following Equation 1.

$$\rho_A = \delta_{power-offset} + P_A + 10\log_{10}(2)[dB] \quad \text{<Equation 1>}$$

In Equation 1, $\delta_{power-offset}$ is a power offset for PDSCH transmission in MU-MIMO. For PDSCH transmission in any other transmission scheme than MU-MIMO, $\delta_{power-offset}$ is set to 0 dB. As described before, $P_A$ is a UE-specific parameter. In a case other than the foregoing PDSCH transmission based on 4-port CRS-based transmission diversity, $\rho_A$ is defined by Equation 2.

$$\rho_A = \delta_{power-offset} + P_A[dB] \quad \text{<Equation 2>}$$

In the legacy LTE system, it is regulated that when a UE receives DL data, it determines the reception power of the data based on a DL reference signal (RS). For example, in the case where the UE receives a Demodulation RS (DM-RS), if a reception rank is 2, the UE assumes that data power is equal to RS power. On the other hand, if the reception rank is 3 or larger, the UE assumes that the difference between the data power and the RS power is 3 dB. In the case where the UE receives a CRS, the UE scales data power based on the reception power of a CRS per OFDM symbol according to $P_A$ and $P_B$ indicated by RRC signaling.

Unlike the above legacy UE, a MUST UE should have knowledge of its data power and the power of interference to be canceled in order to successfully cancel the interference. If there are high and low geometry UEs that receive individual data using the same time resources, the same frequency resources, and the same transmission beam, a MUST UE generally refers to the high geometry UE. For example, the high geometry UE may be UE1 and the low geometry UE may be UE2 in FIG. 7.

Although the low geometry UE also receives interference from the high geometry UE, the data power of the low geometry UE is higher than that of the high geometry UE and receives more severe interference from other signals than a signal from the high geometry UE. Thus, even though the low geometry UE does not remove data intended for the high geometry UE, it does not affect performance significantly.

Now, a method for configuring information about data power and interference power to be canceled is proposed. The power information may be transmitted by DL control information (DCI) of a PDCCH, higher-layer control information such as RRC signaling, or both DCI and higher-layer control information. For example, it is possible to limit a set of power values by higher-layer control information such as RRC signaling and transmit power information using a limited power value of the set.

<Explicit Signaling of Power Information>

First, it is proposed that a control signal for power information is designed and an eNB indicates the data power of a UE and the power of interference to be canceled to the UE by the control signal.

Basically if a MUST UE is capable of cancelling one interfering PDSCH, the eNB signals to the UE only a ratio between the data power of the MUST UE and the power of interference to be canceled. Then, the MUST UE detects DL data power from a received RS by scaling in the conventional manner and determines actual data power and the power of interference to be canceled by additionally applying the ratio.

For example, if the ratio, that is, a distribution ratio a of total power is 0.3, the MUST UE detects DL data power P by scaling RS reception power in the conventional manner, determines a*P to be actual data power, and determines (1-a)*P to be the power of interference to be canceled.

However, if a low geometry UE between two UEs paired in MUST (i.e., between a high geometry UE and the low geometry UE that receive individual data by the same transmission beam) is a legacy UE, this scheme produces the following problem.

Before describing the problem, an operation of the eNB when the low geometry UE is a legacy UE will be described. If the two UEs receive data through the same RSs and the same antenna port, the low geometry UE, that is, the legacy UE determines its data power in the conventional manner. However, since actual transmission power is divided for data of the low geometry UE and data of the high geometry UE, the conventional data power determination method is not viable. Accordingly, the eNB transmits data by deboosting RS power by (1-a) times so that the low geometry UE, that is, the legacy UE may successfully determine data power.

If the MUST UE is supposed to detect the sum of the data power of the low geometry UE and the data power of the high geometry UE from the RS power, this power determination method of the MUST UE is not reliable because the eNB actually deboosts the RS power by power divided from the total power as the data power of the low geometry UE. Therefore, the MUST UE should determine power as follows.

1) The MUST UE detects DL data power by scaling RS reception power in the conventional manner. If the DL data power determined by scaling the RS reception power is represented as P, a*P is determined to be the actual data power and P is determined to be the power of interference to be canceled. For example, if a is 1, the UE determines that the data power is equal to the interference power, assuming that P is divided into equal halves for the data power and the interference power. This is because the RS reception power has already been deboosted for the legacy UE.

2) Or if the eNB indicates not a single value but two or more values as power information to the MUST UE, the above-described problem may be overcome. That is, the eNB signals data power information a1 and interference power information a2 separately. If the low geometry UE is a legacy UE, the eNB indicates a value between 0 and 1 as a1 and 1 as a2 and the MUST UE detects a1P and a2P as data power and interference power, respectively.

On the other hand, if the low geometry UE is not a legacy UE, it may control power by receiving a2 from the eNB. Therefore, the eNB does not need to deboost the RS power. Considering that RS power deboosting may degrade RS channel estimation performance, the RS power deboosting may not be preferable. In this case, a1 and a2 may be values between 0 and 1, and values satisfying that a1+a2=1 may be received.

<Implicit Signaling of Power Information>

In another method, power information may be implicitly signaled by adding an additional meaning for power information to existing control information serving a different purpose. Specifically, the power information may be transmitted using an nSCID of DM-RS transmitted in DCI. For nSCID values, 0 and 1, a ratio a between data power and interference power is defined differently and a UE determines the data power and the interference power using a linked to the nSCID in the above scheme.

For example, the nSCID values, 0 and 1 may indicate that a=0.5 and a=0.1, respectively. Power information linked to an nSCID may be configured differently according to a modulation and coding scheme (MCS) of data of the MUST UE, an MCS of an interfering PDSCH to be canceled, or a combination of the MCSs of the data and the interfering PDSCH. More specifically, different power information may be linked to the nSCID values, 0 and 1 according to modulation orders of data and interference, as illustrated in [Table 1]. The eNB may transmit information about Table 1 to the UE by control information, or the information about Table 1 may be configured to be fixed values, thus obviating the need for transmitting the control information by the eNB. Obviously, the power information may be linked to any other DCI information, aside from nSCID.

TABLE 1

| (modulation order of low geometry UE, modulation order of high geometry UE) | nSCID = 1 | nSCID = 0 |
|---|---|---|
| (QPSK, QPSK) | a = 0.5 | a = 0.2 |
| (QPSK, 16QAM) | a = 0.4 | a = 0.1 |
| (QPSK, 64QAM) | a = 0.3 | a = 0.01 |
| (16QAM, 16QAM) | a = 0.5 | a = 0.2 |
| (16QAM, 64QAM) | a = 0.4 | a = 0.1 |

<Signaling of Power Information Through RS Port>

It may be contemplated as another method for transmitting power information to a UE that the UE calculates the data power of a low geometry UE and the data power of a high geometry UE from different RS ports.

For example, if the eNB performs DM-RS-based PDSCH transmission, the eNB indicates two DM-RS ports (e.g., port 7 and port 8) to which the same precoding is has been applied to the MUST UE. The MUST UE calculates its data power from port 7 and the power of interference to be canceled from port 8. For this purpose, the eNB should transmit a DM-RS with the same power as the data power of the high geometry UE through port 7 and a DM-RS with the same power as the data power of the low geometry UE through port 8.

In this method, additional control information with which to determine data power or interference power, for example, a, a1, and a2 is not used, and data power and interference power are measured and calculated through different ports. One thing to note herein is that the eNB and the UE should have prior knowledge of the respective ports through which data power and interference power are measured and calculated. Therefore, the eNB may indicate an antenna port through which the interference power is to be measured and calculated to the UE by DCI or RRC signaling.

In another example, if port 7 is signaled as a DM-RS port for the high geometry UE by DCI, the high geometry UE measures and calculates interference power by receiving, through port 8, a DM-RS to which the same sequence and nSCID as used for a DMRS transmitted through port 7 are applied. Obviously, the high geometry UE measures and calculates its data power through port 7. On the contrary, if port 8 is signaled as a DM-RS port for the high geometry UE by DCI, the high geometry UE measures and calculates interference power through port 7.

In another example, if port 7 is signaled as a DM-RS port for the high geometry UE by DCI, the high geometry UE measures and calculates interference power by receiving, through port 8, a DM-RS to which the same sequence and nSCID as used for a DM-RS transmitted through port 7 are applied. Obviously, the high geometry UE measures and calculates its data power using an nSCID signaled by the DCI. In this case, since the DM-RS port for data power measurement and the DM-RS port for interference power measurement are quasi-orthogonal to each other, the power measurement may be inaccurate, and the resulting transmission of two quasi-orthogonal DM-RSs in the same transmission beam may degrade channel estimation performance. However, if the high geometry UE receives rank-2 data through port 7 and port 8, this method may be useful.

If RSs received through different antenna ports are used for measurement and calculation of data power and interference power, the MUST UE performs channel estimation using an RS received through an antenna port having higher reception power. Since the two ports show the same effective channels to the UE, the UE performs channel estimation using the RS received through the antenna port having the higher reception power, thus increasing channel estimation performance. For example, when the UE measures and calculates its data power through port 7 and the power of interference to be canceled through port 8, if the reception power of port 8 is higher than that of port 7, the UE decodes its data and an interfering PDSCH by estimating a channel using a DM-RS received through port 8.

<Relationship with $P_A$ and $P_B$>

FIG. 10 is an exemplary view illustrating the concept of power allocation in a MUST system according to an embodiment of the present invention. Particularly, FIG. 10 illustrates a coordinate system in which the horizontal axis represents OFDM symbols, the vertical axis represents subcarriers, and the heights of OFDM symbols represent power.

In a CRS-based transmission scheme, a UE calculates ratios of data power to CRS power, $\rho_A$ and $\rho_B$ using $P_A$ and $P_B$. Meanwhile, in a data power and interference power determination scheme for a MUST UE, the MUST UE scales the CRS power by $\rho_A$ and $\rho_B$ in the conventional manner, receives additional power information (a, a1, a2, etc.) for MUST implementation, and scales the resulting value by the additional power information, as illustrated in FIG. 10.

In this manner, the values resulting from the two scalings may be defined as $\rho_A'$ and $\rho_B'$, and a scaling parameter for data power, $\rho_{A\_s}'$, $\rho_{B\_s}'$ and a scaling parameter for interference power to be canceled, $\rho_{A\_I}'$, $\rho_{B\_I}'$ may be given as Equation 3.

$$\rho'_{A\_S} = \delta_{power\text{-}offset} + P_A + 10\log(a)[\text{dB}] \quad \langle\text{Equation 3}\rangle$$

$$\rho'_{A\_I} = \delta_{power\text{-}offset} + P_A + 10\log(1-a)[\text{dB}]$$

$$P_B = \frac{\rho'_{B\_S}}{\rho'_{A\_S}} = \frac{\rho'_{B\_I}}{\rho'_{A\_I}}$$

However, if a=1 in Equation 3, the UE neglects $\rho_{A\_I}'$ and $\rho_{B\_I}'$, determining that there is no interference to be canceled. That is, the eNB indicates to the UE that not MUST transmission but non-MUST transmission has been performed by transmitting a=1. Preferably, the eNB may indicate a dynamically by DCI to thereby indicate dynamically whether MUST transmission has been performed.

If the power information is signaled as a1 and a2, Equation 3 may be modified to Equation 4. If a2=0 in Equation 4, the UE neglects $\rho_{A\_I}'$ and $\rho_{B\_I}'$, determining that there is no interference to be canceled. That is, the eNB indicates to the UE that not MUST transmission but non-MUST transmission has been performed by transmitting a2=0. Preferably, the eNB may indicate a1 and a2 dynamically by DCI to thereby indicate dynamically whether MUST transmission has been performed.

$$\rho_{A\_s}'=\delta_{power\text{-}offset}+P_A+10\ \log(a1)[dB]$$

$$\rho_{A\_i}'=\delta_{power\text{-}offset}+P_A+10\ \log(a2)[dB] \qquad \text{<Equation 4>}$$

In [Equation 3] and [Equation 4], $\delta_{power\text{-}offset}$ is used for CRS-based MU-MIMO transmission. In a transmission other than CRS-based MU-MIMO transmission, $\delta_{power\text{-}offset}$ is set to 0 dB. However, $\delta_{power\text{-}offset}$ may be replaced with a power offset value for MUST other than a legacy usage in a MUST transmission mode, as illustrated in Equation 5.

$$\rho_A'=\delta_{power\text{-}offset}+P_A,$$

if $\delta_{power\text{-}offset}=10\ \log(a)$, then $\rho_A'=\rho_{A\_s}'$ if $\delta_{power\text{-}offset}=10\ \log(1-a)$, then $\rho_A'=\rho_{A\_i}'$ if $\delta_{power\text{-}offset}=10\ \log(a1)$, then $\rho_A'=\rho_{A\_s}'$ if $\delta_{power\text{-}offset}=10\ \log(a2)$, then $\rho_A'=\rho_{A\_i}'$ <Equation 5>

In Equation 3 and Equation 4, the MUST UE still calculates data power and interference power to be canceled using PA indicated by RRC signaling. However, when receiving data, the MUST UE may scale RS reception power using only power information received from the eNB and then calculate the data power and the interference power, without further applying PA. That is, the MUST UE may calculate intended power, assuming that $P_A$ or $\delta_{power\text{-}offset}$ is 0 in Equation 3 and Equation 4. Even in this case, the cell-specific $P_B$ may be applied. When needed, the UE may not apply $P_B$ and may receive a third value dynamically from the eNB, for calculation of a ratio of data EPRE to RS EPRE in a symbol with CRSs and a ratio of data EPRE to RS EPRE in a symbol without CRSs.

While a case where MUST is applied to layer has been described, by way example, if multiple layers are transmitted, individual power information about each layer or common power information about all layers may be transmitted. If power information about each layer is individually transmitted, the eNB may indicate MUST transmission ON/OFF for each layer to the UE by power information about the layer. That is, the eNB indicates to the UE that MUST transmission has not been performed for a specific layer and thus general non-MUST transmission has been performed for the specific layer by transmitting a=1 for the specific layer to the UE. Or the eNB indicates to the UE that MUST transmission has not been performed for a specific layer and thus general non-MUST transmission has been performed for the specific layer by transmitting a2=0 for the specific layer to the UE.

In another method, the eNB dynamically indicates a $P_A$ or $P_B$ value to the MUST UE by DCI. Upon receipt of the $P_A$ or $P_B$ value by the DCI, the MUST UE neglects a previous $P_A$ or $P_B$ value indicated by RRC signaling and calculates $\rho_A$ and $\rho_B$ using the $P_A$ or $P_B$ value received by the DCI.

It has been described that one $P_A$ or $P_B$ value is signaled to each UE and the UE calculates the power of an intended PDSCH and the power of a PDSCH to be eliminated. In another method, a $P_A$ or $P_B$ value for calculation of intended PDSCH power (e.g., $P_{A\_s}$ or $P_{B\_s}$) and a $P_A$ or $P_B$ value for calculation of PDSCH power to be canceled (e.g., $P_{A\_i}$ or $P_{B\_i}$) may be signaled separately to the UE and the UE may use the signaled values respectively in calculating the intended PDSCH power and the PDSCH power to be canceled.

For example ($P_{A\_s}=0$, $P_{B\_s}=1$) and ($P_{A\_s}=3$, $P_{B\_i}=1$) may be signaled to the UE, and the UE uses ($P_{A\_s}=0$, $P_{B\_s}=$=in calculating the intended PDSCH power and ($P_{A\_i}=-3$, $P_{B\_i}=1$) in calculating the PDSCH power to be canceled.

Although power information (e.g., a, a1, a2, $P_A$, $P_B$, $P_{A\_s}$, $P_{B\_s}$, $P_{A\_i}$, $P_{B\_i}$, etc.) about data power of the UE and interference power to be canceled may be indicated in a set to the UE in MUST transmission, a plurality of sets may be signaled to the UE and the UE may detect actual power information to be used from the sets by blind detection. For example, the eNB may indicate three values a={0.5, 0.2, 0.1} to the UE and the UE may detect one of the three values by blind detection.

<Relationship Between Modulation Order and Power Information>

In MUST transmission, information about the data power of a low geometry UE and the data power of a high geometry UE may be transmitted to the low geometry UE as well as the high geometry UE. In this case, the low geometry UE may use the information in decoding its data.

For example, the low geometry UE may estimate interference power more accurately by adding the data power of the high geometry UE causing interference to interference power measured in an interference measurement resource (IMR), assuming that the data power of the high geometry UE is interference power. As a consequence, the low geometry UE may calculate optimal reception beamforming and use the optimal reception beamforming in improving decoding performance.

The information about the data power of the low geometry UE and the data power of the high geometry UE in MUST transmission may vary depending on a combination of the modulation order of data of the low geometry UE and the modulation order of data of the high geometry UE. For example, if the combination of the modulation orders is (QPSK, QPSK), a=0.2. If the combination of the modulation orders is (QPSK, 16QAM), a=0.15. If the combination of the modulation orders is (QPSK, 64QAM), a=0.1. Power information (e.g., a) may be predefined for each modulation order combination, and the eNB and the UE may use the same value.

Data power information for each modulation order combination may be defined as one fixed value or a set of a plurality of values. If the data modulation orders of the low geometry UE and the high geometry UE are (QPSK, QPSK), a may be defined as 0.2 or 0.3. If the data modulation orders of the low geometry UE and the high geometry UE are (QPSK, 16QAM), a may be defined as 0.15 or 0.1. If the data modulation orders of the low geometry UE and the high geometry UE are (QPSK, 64QAM), a may be defined as 0.1 or 0.05. Additionally, the power information may vary depending a combination of data ranks of the low and high geometry UEs as well as a combination of modulation orders of data of the low and high geometry UEs.

More simply, power information (e.g., a) may be defined to be one value irrespective of a modulation order combination, and in the case of MUST transmission, the eNB and the UE may always use this value. That is, a may be defined as 0.1 regardless of whether the data modulation order of the low geometry UE and the data modulation order of the high geometry UE are (QPSK, QPSK), (QPSK, 16QAM), or (QPSK, 64QAM).

In another method, a power information value may not be defined separately, and the eNB may indicate power information per modulation order combination (e.g., a) individually to the UE by signaling. Also, the eNB may determine power information (for example, a) irrespective of a modulation order combination and signal the determined power information to the UE.

When the eNB performs the MUST transmission, the eNB may inform directly the UE of information on the power information (e.g., a) via the control channel, or the UE itself can detect the power information by a blind detection or blind decoding (BD). In the latter case, the eNB may provide additional information related to the BD of the power information in order to reduce complexity of calculation and increase probability of the BD. This additional information may comprise a range or a unit (or interval) of the power information which the UE should find by the BD. For example, when the UE finds the value of the power information 'a' by the BD, the eNB may indicate 0.1≤a≤0.3 as the range of 'a' and/or 0.1 as the unit (or interval) of 'a'. Then, the UE may perform the BD within the indicated range based on the indicated unit. For example, the UE may perform the BD for finding 'a' within 0.1≤a≤0.3 increasing by 0.1.

FIG. 11 is a flowchart illustrating an exemplary method for receiving a signal from an eNB by a MUST UE according to an embodiment of the present invention.

Referring to FIG. 11, the MUST UE receives power multiplexing information from the eNB in step 1101. The power multiplexing information may be power information (e.g., a, a1, a2, $P_A$, $P_B$, $P_{A\_s}$, $P_{B\_s}$, $P_{A\_i}$, $P_{B\_i}$, etc.) about data power of the UE and interference power to be canceled. Or if the power information is signaled through RS ports, the power multiplexing information may include information about an RS port mapping relationship between a data signal and an interference signal.

More specifically, the power multiplexing information may include information about a ratio between the reception power of the DL signal and the reception power of the data signal or information about a ratio of the reception power of the data signal to the reception power of the interference signal. Further, the power multiplexing information may include both the information about the ratio of the reception power of the data signal to the reception power of the RS and the information about the ratio of the reception power of the interference signal to the reception power of the RS.

Subsequently, the MUST UE receives an RS and the DL signal from the eNB in step 1102, and calculates the reception power of the interference signal from the reception power of the DL signal using the RS and the power multiplexing information in step 1103. As consequence, the MUST UE acquires its data signal by eliminating the reception power of the interference signal from the reception power of the DL signal in step 1104.

FIG. 12 is a block diagram of a communication apparatus according to an embodiment of the present invention.

Referring to FIG. 12, a communication apparatus 1200 includes a processor 1210, a memory 1220, an RF module 1230, a display module 1240, and a User Interface (UI) module 1250.

The communication device 1200 is shown as having the configuration illustrated in FIG. 12, for the convenience of description. Some modules may be added to or omitted from the communication apparatus 1200. In addition, a module of the communication apparatus 1200 may be divided into more modules. The processor 1210 is configured to perform operations according to the embodiments of the present invention described before with reference to the drawings. Specifically, for detailed operations of the processor 1210, the descriptions of FIGS. 1 to 11 may be referred to.

The memory 1220 is connected to the processor 1210 and stores an Operating System (OS), applications, program codes, data, etc. The RF module 1230, which is connected to the processor 1210, upconverts a baseband signal to an RF signal or downconverts an RF signal to a baseband signal. For this purpose, the RF module 1230 performs digital-to-analog conversion, amplification, filtering, and frequency upconversion or performs these processes reversely. The display module 1240 is connected to the processor 1210 and displays various types of information. The display module 1240 may be configured as, not limited to, a known component such as a Liquid Crystal Display (LCD), a Light Emitting Diode (LED) display, and an Organic Light Emitting Diode (OLED) display. The UI module 1250 is connected to the processor 1210 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

According to an embodiment of the present invention, it is possible to efficiently report feedback information for division beamforming in a wireless communication system.

It will be appreciated by persons skilled in the art that that the effects that can be achieved through the present invention are not limited to what has been particularly described hereinabove and other advantages of the present invention will be more clearly understood from the following detailed description.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the afore-described method and apparatus for performing network cooperative communication to distribute traffic in a wireless communication system have been described in the context of application to a 3GPP LTE system, they are also applicable to various mobile communication systems in addition to the 3GPP LTE system.

The invention claimed is:

1. A method for receiving a downlink signal from a base station (BS) by a user equipment (UE) in a wireless communication system, the method comprising:
receiving, via a higher layer, a first UE specific parameter $P_A$ or a first cell specific parameter $P_B$, and a second UE specific parameter $P_A$ or a second cell specific parameter $P_B$ about a first power ratio between the downlink signal and a cell specific reference signal (CRS);
receiving downlink control information (DCI) including third information about a second power ratio between a downlink data for the UE and a Multi-user Superposition Transmission (MUST) interference signal; and
receiving the downlink signal based on a transmission power, wherein the transmission power is determined based on (i) a number of antenna ports for transmit diversity used for the downlink signal and (ii) one of the first $P_A$ or $P_B$ and the second $P_A$ or $P_B$,
wherein, based on the third information including a first value, the downlink signal includes the downlink data and does not include the MUST interference signal, and the first PA or PB is used for determining the transmission power of the UE not configured for MUST, and
wherein, based on the third information including a value except the first value, the downlink signal includes the downlink data and the MUST interference signal and the second PA or PB is used for determining the transmission power of the UE configured for the MUST.

2. The method according to claim 1, wherein the downlink data and the MUST interference signal are transmitted in a same time resource and a frequency resource based on a same precoding.

3. The method according to claim 1, wherein the transmission power is obtained based on scaling a transmission power of the CRS based on the first PA or PB, and wherein the transmission power of the CRS is obtained via the higher layer.

4. A user equipment (UE) in a wireless communication system, the UE comprising:
a radio frequency (RF) unit; and
at least one processor connected with the RF unit and configured to:
control the RF unit to receive, via a higher layer, a first UE specific parameter $P_A$ or a first cell specific parameter $P_B$, and a second UE specific parameter $P_A$ or a second cell specific Dara meter $P_B$ about a first power ratio between a downlink signal and a cell specific reference signal (CRS),
control the RF unit to receive downlink control information (DCI) including third information about a second power ratio between a downlink data for the UE and a Multi-user Superposition Transmission (MUST) interference signal, and
control the RF unit to receive the downlink signal based on a transmission power,
wherein the transmission power is determined based on (i) a number of antenna ports for transmit diversity used for the downlink signal and (ii) one of the first $P_A$ or $P_B$ and the second $P_A$ or $P_B$,
wherein, based on the third information including a first value, the downlink signal includes the downlink data and does not include the MUST interference signal, and the first $P_A$ or $P_B$ is used for determining the transmission power of the UE not configured for MUST, and
wherein, based on the third information including a value except the first value, the downlink signal includes the downlink data and the MUST interference signal and the second $P_A$ or $P_B$ is used for determining the transmission power of the UE configured for the MUST.

5. The UE according to claim 4, wherein the downlink data and the MUST interference signal are transmitted in a same time resource and a frequency resource based on a same precoding.

6. The UE according to claim 4, wherein the transmission power is obtained based on scaling a transmission power of the CRS based on the first $P_A$ or $P_B$, and wherein the transmission power of the CRS is obtained via the higher layer.

* * * * *